United States Patent
Hyde et al.

(10) Patent No.: US 9,644,456 B2
(45) Date of Patent: *May 9, 2017

(54) UNDERWATER OIL PIPELINE HEATING SYSTEMS

(71) Applicant: Elwha LLC, Bellevue, WA (US)

(72) Inventors: Roderick A. Hyde, Redmond, WA (US); Thomas Allan Weaver, San Mateo, CA (US); Lowell L. Wood, Jr., Bellevue, WA (US)

(73) Assignee: Elwha LLC, Bellevue, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/155,901

(22) Filed: May 16, 2016

(65) Prior Publication Data

US 2016/0258255 A1    Sep. 8, 2016

Related U.S. Application Data

(63) Continuation of application No. 14/717,747, filed on May 20, 2015, now Pat. No. 9,341,314, which is a
(Continued)

(51) Int. Cl.
*E21B 17/01*    (2006.01)
*E21B 36/00*    (2006.01)
(Continued)

(52) U.S. Cl.
CPC ........ *E21B 43/0122* (2013.01); *E02B 15/042* (2013.01); *E21B 36/005* (2013.01);
(Continued)

(58) Field of Classification Search
CPC .... E21B 17/01; E21B 36/008; E21B 43/0122; E21B 36/005; E21B 36/02; F16L 53/00; F16L 53/002; E02B 15/042; F17D 1/18
See application file for complete search history.

(56) References Cited

U.S. PATENT DOCUMENTS 3,107,728 A * 10/1963 Kehn ...................... E21B 36/02
                                                        166/300
4,077,777 A    3/1978 Henke
(Continued)

FOREIGN PATENT DOCUMENTS

KR    20090120826    11/2009

OTHER PUBLICATIONS

PCT International Search Report; Application No. PCT/US2013/070584; Mar. 24, 2014; pp. 1-7.

*Primary Examiner* — Matthew R Buck
(74) *Attorney, Agent, or Firm* — Foley & Lardner LLP

(57) ABSTRACT

A system for reducing buildup of solids in pipes used in underwater oil operations is disclosed. The system includes an annular pipe having an inner pipe wall and an outer pipe wall. The inner pipe wall defines an inner pipe configured to transport an oil. The outer pipe wall is displaced from the inner pipe wall. The outer pipe wall defines an outer pipe between the outer pipe wall and the inner pipe wall. The system includes an oxidizer delivery pipe having an oxidizer delivery outlet. The oxidizer delivery pipe is configured to supply an oxidizer to the outer pipe. The system further includes a fuel delivery pipe having a fuel delivery outlet. The fuel delivery pipe is configured to supply a fuel to the outer pipe. The oxidizer and the fuel release thermal energy in an exothermic reaction.

34 Claims, 6 Drawing Sheets

Related U.S. Application Data continuation of application No. 13/682,399, filed on Nov. 20, 2012, now Pat. No. 9,062,808.

(51) Int. Cl.

| | | |
|---|---|---|
| *F16L 53/00* | (2006.01) | |
| *E21B 43/01* | (2006.01) | |
| *E21B 36/02* | (2006.01) | |
| *F17D 1/18* | (2006.01) | |
| *E02B 15/04* | (2006.01) | |
| *E02B 15/00* | (2006.01) | |

(52) U.S. Cl.
CPC .............. *E21B 36/02* (2013.01); *F16L 53/00* (2013.01); *F16L 53/002* (2013.01); *F17D 1/18* (2013.01); *E02B 2015/005* (2013.01); *Y10T 137/0391* (2015.04); *Y10T 137/6443* (2015.04)

(56) References Cited

U.S. PATENT DOCUMENTS

| | | | |
|---|---|---|---|
| 4,446,917 A * | 5/1984 | Todd ................. E21B 36/02 122/4 D |
| 4,463,803 A * | 8/1984 | Wyatt ................. F22B 1/26 122/31.1 |
| 4,589,434 A | 5/1986 | Kelley | |
| 4,679,598 A * | 7/1987 | Jee ................. E21B 43/01 138/103 |
| 4,755,230 A * | 7/1988 | Ashton ............. B08B 7/0071 134/22.14 |
| 5,256,844 A | 10/1993 | Grosvik et al. | |
| 5,639,313 A * | 6/1997 | Khalil ................. B08B 9/032 134/18 |
| 5,713,416 A | 2/1998 | Chatterji et al. | |
| 6,028,235 A | 2/2000 | Heinemann et al. | |
| 6,278,095 B1 | 8/2001 | Bass et al. | |
| 6,292,627 B1 | 9/2001 | Gilchrist et al. | |
| 6,509,557 B1 | 1/2003 | Bass | |
| 6,672,391 B2 | 1/2004 | Anderson et al. | |
| 6,756,021 B2 * | 6/2004 | Botrel ............. B08B 7/0071 422/184.1 |
| 6,889,770 B2 | 5/2005 | Qvam et al. | |
| 6,939,082 B1 | 9/2005 | Baugh | |
| 7,036,596 B2 * | 5/2006 | Reid ................. E21B 36/005 165/104.21 |
| 7,234,523 B2 * | 6/2007 | Reid ................. E21B 36/005 165/104.21 |
| 7,597,147 B2 | 10/2009 | Vitek et al. | |
| 7,669,659 B1 | 3/2010 | Lugo | |
| 8,220,552 B2 * | 7/2012 | Kinnari ............. F17D 1/05 166/344 |
| 8,517,632 B2 * | 8/2013 | Later ................. E21B 43/0122 405/210 |
| 8,986,547 B2 * | 3/2015 | Baccigalopi ........ B23K 31/027 166/359 |
| 9,062,808 B2 * | 6/2015 | Hyde ................. F16L 53/00 |
| 9,341,314 B2 * | 5/2016 | Hyde ................. F16L 53/00 |
| 2004/0060693 A1 | 4/2004 | Bass et al. | |
| 2007/0042306 A1 * | 2/2007 | Bacon ................. E21B 36/02 431/268 |
| 2009/0200023 A1 | 8/2009 | Costello et al. | |
| 2010/0139924 A1 * | 6/2010 | Abney ................. E21B 36/005 166/335 |
| 2011/0299929 A1 * | 12/2011 | Sabourin ............. E21B 43/0122 405/60 |
| 2012/0298216 A1 * | 11/2012 | Geertsen ............. F16L 53/002 137/340 |
| 2013/0025875 A1 * | 1/2013 | Critsinelis ............. E21B 17/01 166/372 |
| 2013/0046126 A1 * | 2/2013 | Varney ................. B63B 35/32 588/260 |
| 2013/0061935 A1 * | 3/2013 | Evertz ................. E21B 43/0122 137/1 |

* cited by examiner

UNDERWATER OIL PIPELINE HEATING SYSTEMS

CROSS-REFERENCE TO RELATED APPLICATIONS

This application is a continuation of application Ser. No. 14/717,747, filed May 20, 2015, which is a continuation of application Ser. No. 13/682,399, filed Nov. 20, 2012, now U.S. Pat. No. 9,062,808, both of which are herein incorporated by reference in their entireties and for all purposes.

BACKGROUND

A common problem associated with underwater oil drilling is the buildup of solids in oil-carrying pipes and equipment. Solid hydrates, paraffin, and clathrates form in underwater oil-carrying pipes and equipment used in underwater oil drilling operations. Solid hydrates and clathrates form when a crude oil stream containing water is exposed to the low temperatures and the high pressures associated with underwater oil drilling. Additionally, crude oil commonly contains paraffins that solidify when exposed to the low temperatures associated with underwater oil drilling. Buildup of the solids in the oil-carrying pipes can reduce or stop the flow of crude oil from an underwater oil well to the surface or to a processing facility.

In addition to the buildup of solids in oil-carrying pipes and equipment, crude oil often contains gaseous hydrocarbons (e.g., methane or natural gas) that are removed using degassing facilities that separate the gaseous hydrocarbons from the crude oil. After separating the gaseous hydrocarbons from the liquid oil, the hydrocarbons are typically combusted in a flare stack on or near the drilling site. The controlled combustion reduces the explosion risk associated with storing the gaseous hydrocarbons and produces carbon-dioxide.

SUMMARY

One exemplary embodiment relates to a system for reducing buildup of solids in pipes used in underwater oil operations. The system includes an annular pipe having an inner pipe wall and an outer pipe wall. The inner pipe wall defines an inner pipe configured to transport an oil. The outer pipe wall is displaced from the inner pipe wall. The outer pipe wall defines an outer pipe between the outer pipe wall and the inner pipe wall. The system includes an oxidizer delivery pipe having an oxidizer delivery outlet. The oxidizer delivery pipe is configured to supply an oxidizer to the outer pipe. The system further includes a fuel delivery pipe having a fuel delivery outlet. The fuel delivery pipe is configured to supply a fuel to the outer pipe. The oxidizer and the fuel release thermal energy in an exothermic reaction.

Yet another exemplary embodiment relates to a system for reducing buildup of solids in pipes used in underwater oil operations. The system includes an annular pipe having an inner pipe wall and an outer pipe wall. The inner pipe wall defines an inner pipe configured to transport oil. The outer pipe wall is displaced from the inner pipe wall and defines a combustion chamber between the inner pipe wall and the outer pipe wall. The system includes an oxidizer delivery pipe having an oxidizer delivery outlet. The oxidizer delivery pipe is configured to supply an oxidizer to the combustion chamber. The system further includes a fuel delivery pipe having a fuel delivery outlet. The fuel delivery pipe is configured to supply a fuel to the combustion chamber. The system includes an ignition mechanism. The system further includes a controller. The controller is configured to potentiate combustion of the oxidizer and the fuel within the combustion chamber.

Another exemplary embodiment relates to a system for reducing buildup of solids in pipes used in underwater oil operations. The system includes an outer pipe wall defining a pipe configured to transport oil. The system further includes an oxidizer delivery pipe having an outlet. The oxidizer delivery pipe is configured to supply an oxidizer to the pipe. The system includes a sensor configured to detect a condition within the pipe. The system further includes a controller configured to open and close the outlet such that the oxidizer is selectively released into the pipe. The oxidizer and a portion of the oil release thermal energy in an exothermic reaction.

An additional exemplary embodiment relates to a system for containing an underwater oil leak. The system includes a collection shed having a first opening configured to capture oil leaking from an underwater structure. The system further includes a pipe coupled to a second opening of the collection shed. The pipe is configured to transport oil away from the collection shed. The system includes an oxidizer delivery pipe having a plurality of outlets. The oxidizer delivery pipe is configured to supply an oxidizer to at least one of the pipe and the collection shed. The system further includes a controller configured to independently open and close individual outlets of the plurality of outlets such that the oxidizer is selectively released into at least one of the pipe and the collection shed. The oxidizer and a portion of the oil release thermal energy in an exothermic reaction.

Yet a further exemplary embodiment relates to a method of heating an oil transport pipe. The method includes providing an annular pipe beneath a surface of a body of water. The method includes transporting oil through an inner chamber of the annular pipe. The method further includes providing an oxidizer and providing a fuel to an outer chamber of the annular pipe. The method further includes reacting the oxidizer and the fuel in an exothermic reaction.

Another exemplary embodiment relates to a method of heating an underwater oil transport pipe. The method includes providing a pipe beneath a surface of a body of water and transporting oil through the pipe. The method includes providing an oxidizer to the pipe. The method further includes reacting the oxidizer and a portion of the oil in an exothermic reaction.

Another exemplary embodiment relates to a system for reducing buildup of solids in pipes used in underwater oil operations. The system includes a first pipe configured to transport an oil. The system further includes a second pipe configured to provide thermal energy to the first pipe. The system includes an oxidizer delivery pipe having an oxidizer delivery outlet. The oxidizer delivery pipe is configured to supply an oxidizer to the second pipe. The system further includes a fuel delivery pipe having a fuel delivery outlet. The fuel delivery pipe is configured to supply a fuel to the second pipe such that the oxidizer and the fuel release thermal energy in an exothermic reaction.

The invention is capable of other embodiments and of being carried out in various ways. Alternative exemplary embodiments relate to other features and combinations of features as may be generally recited in the claims.

The foregoing is a summary and thus by necessity contains simplifications, generalizations, and omissions of detail. Consequently, those skilled in the art will appreciate that the summary is illustrative only and is not intended to be in any way limiting. Other aspects, inventive features, and advantages of the devices and/or processes described herein, as defined solely by the claims, will become apparent in the detailed description set forth herein and taken in conjunction with the accompanying drawings.

DETAILED DESCRIPTION

Before turning to the figures, which illustrate the exemplary embodiments in detail, it should be understood that the application is not limited to the details or methodology set forth in the description or illustrated in the figures. It should also be understood that the terminology is for the purpose of description only and should not be regarded as limiting.

Figure 1:
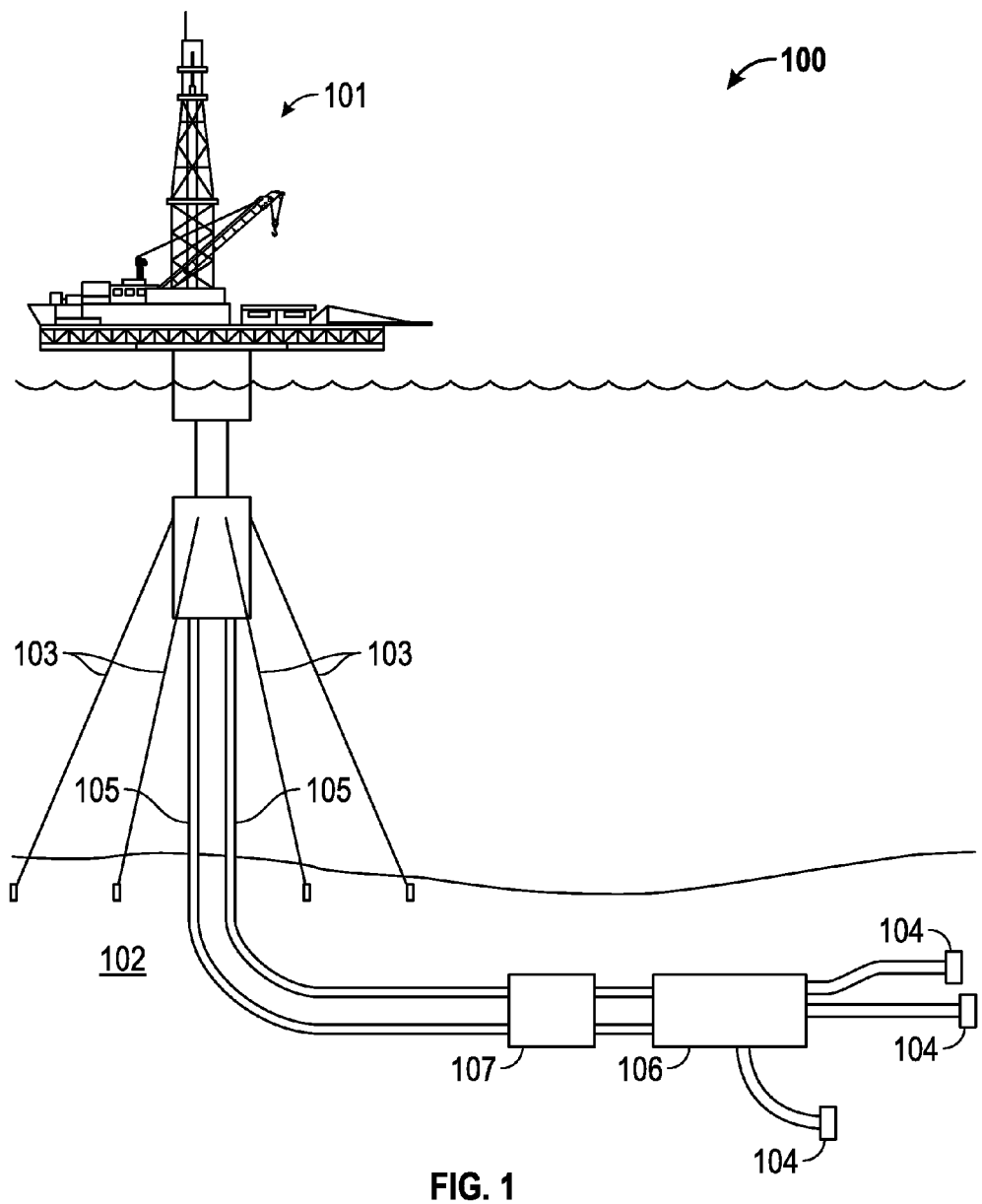
FIG. 1 is a schematic view of an underwater oil drilling operation.

Referring to FIG. 1, a schematic view of an underwater oil drilling system 100 is shown according to an exemplary embodiment. Floating oil rig 101 is tethered to seabed 102 through a system of tethers 103. Oil rig 101 connects to underwater wells 104 through risers 105, collection manifold 106, and degassing facility 107. Crude oil from wells 104 is collected in collection manifold 106 and then passed through degassing facility 107. Degassing facility 107 is configured to separate methane, natural gas, and any other gases contained with the liquid crude oil from wells 104. Alternatively, collection manifold 106 includes an integral degassing facility. In yet another alternate embodiment, oil rig 101 includes a degassing facility. After passing through degassing facility 107, crude oil is pumped up to the surface through risers 105. Alternatively, crude oil is laterally pumped along seabed 102 from degassing facility 107 to an additional oil processing or storage station (e.g., on-shore oil refinery or underwater processing station). Underwater wells 104 may be located at depths in excess of 3,000 meters beneath sea level.

Figure 2:
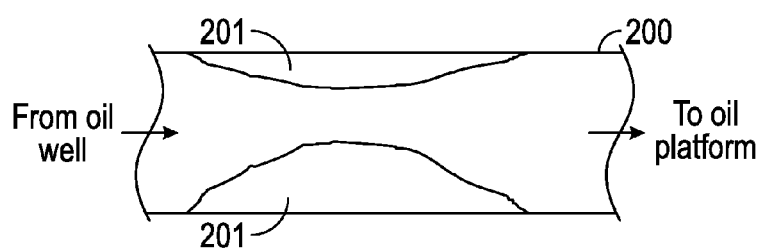
FIG. 2 is a cross-sectional view of an oil-carrying pipe having solid buildups.

Crude oil pumped from underwater wells 104 is not pure in composition. Crude oil often contains paraffins, water, and gaseous hydrocarbons. When paraffins are exposed to the combination of cold temperatures and high pressures associated with the depths at which underwater oil drilling takes place, the paraffins may solidify and buildup within oil-carrying pipes and oil processing equipment. Additionally, solid hydrates and clathrates may form when crude oil containing water is exposed to the low temperatures and the high pressures associated with underwater oil drilling. As shown in FIG. 2, an oil carrying pipe 200 contains buildups of solids 201 (e.g., paraffins, hydrates, and clathrates). The buildups of solids 201 may restrict or cut-off the flow of crude oil from the underwater wells to the surface or to an oil processing station. According to one exemplary embodiment, heat is provided to the underwater oil-carrying pipes to prevent buildup and pipe blockage. The heat raises the temperature of the crude oil above the melting point for any solids 201 contained within oil. Accordingly, the heat melts existing solids 201 and prevents additional solids from forming.

Figure 3:
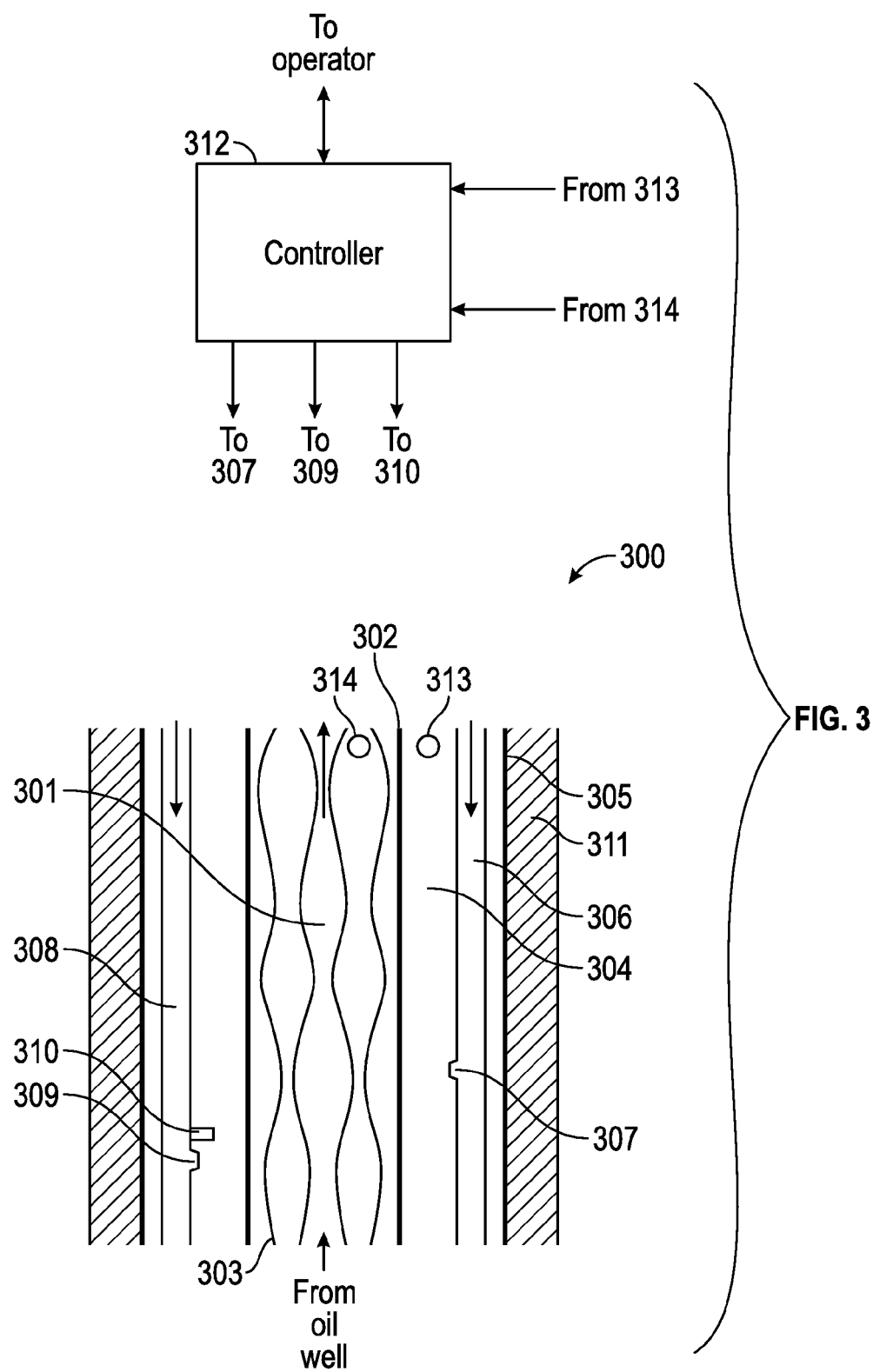
FIG. 3 is a cross-sectional view of a heated oil-carrying pipe according to an exemplary embodiment.

Referring to FIG. 3, an exemplary embodiment of heated oil-carrying pipe 300 is provided. Pipe 300 may be incorporated into riser pipes (e.g., risers 105 in FIG. 1), pipes within underwater facilities (e.g., collection manifold 106 in FIG. 1), pipes carrying oil directly from well heads, and any other underwater oil transport device or processing facility. Pipe 300 is a multi-layered annular pipe and includes inner pipe 301 and outer pipe 304. Inner pipe 301 is defined by inner pipe wall 302. Inner pipe wall 302 is constructed from a material having a high thermal conductivity. Inner pipe 301 carries oil 303 from underwater oil wells. Outer pipe 304 is defined by outer pipe wall 305. Outer pipe wall 305 is constructed from a material that acts as a thermal insulator. Although pipe 300 is shown as an annular pipe, it should be appreciated that other pipe configurations are possible. For example, the outer pipe wall can only partially encircle the inner pipe such that a portion of the inner pipe wall is exposed to the external environment and a portion of the inner pipe wall is encircled by the outer pipe wall. Alternatively, a first oil carrying pipe may be heated by a second exothermic reaction pipe. In this arrangement, the first and second pipes are arranged such that the two pipes share a contact surface or utilize a heat spreader to transfer heat from the exothermic reaction pipe to the oil carrying pipe.

Outer pipe 304 houses oxidizer delivery pipe 306 having a remotely controllable outlet (shown as valve 307) such that an oxidizer is delivered into outer pipe 304 from the surface through valve 307. The oxidizer can be any of oxygen, atmospheric air, peroxides, nitrates, nitrites, perchlorates, chlorates, chlorites, hypochlorites, dichromates, permanganates, persulfates, or any mixture thereof. Additionally, outer pipe 304 houses fuel delivery pipe 308 having a remotely controllable outlet (shown as valve 309) such that gaseous or liquid fuel is delivered to outer pipe 304 from the surface through valve 309. Alternatively, inner pipe wall 302 includes portals to provide fuel from inner pipe 301 to outer pipe 304. The fuel can be liquid or gaseous hydrocarbons, hydrogen gas, reactive metals such as aluminum, sodium, beryllium, or any mixture thereof. Hydrocarbon fuels can be imported from external sources or can be associated with the oil material being transported in the inner pipe and transferred to the outer pipe by portals in the inner pipe wall. Such oil derived fuels can comprise gaseous components such as hydrogen, methane, or natural gas, or can comprise liquid components of the oil. The fuel and oxidizer combust within outer pipe 304, which serves as a combustion chamber. The combustion generates thermal energy. Alternatively, the fuel and oxidizer undergo an exothermic non-combustion based chemical reaction to generate thermal energy. The non-combustion based chemical reaction may be facilitated through the use of a catalyst. The thermal energy generated by the combustion of the fuel and oxidizer heats inner pipe 301 and oil 303 such that buildups of solids (shown as 201 in FIG. 2) do not form and existing solids melt into liquid. Ignition mechanism 310 facilitates the combustion of the fuel and oxidizer. Alternatively, the combustion is hypergolic and occurs spontaneously through a chemical reaction between the fuel and oxidizer. Pipe 300 is thermally insulated from the outside environment through a layer of insulation 311. Exhaust gases created by the combustion of the fuel and oxidizer can be carried to the surface through outer pipe 304. Alternatively exhaust gases can be locally vented to the surrounding water or into the inner pipe. While the outer pipe in FIG. 3 is shown as completely surrounding the inner pipe, it should be appreciated, that the outer pipe may not occupy the full azimuthal circumference of the inner pipe. In some embodiments, the outer pipe may be a separate pipe, not sharing a fluid-containment wall with the inner pipe; in such cases the inner and outer pipes may be structurally connected, and may be thermally coupled by thermally conductive members. While fuel and oxidizer are shown as having separate delivery pipes and delivery outlets, in some embodiments the fuel and oxidizer can be pre-mixed and delivered together through a common delivery pipe and delivery outlet.

Controller 312 is programmed to control the heating of pipe 300. Generally, controller 312 includes processing circuitry and memory. Controller 312 may be located offsite (e.g., on floating oil rig 101). Controller 312 coordinates the amounts of both fuel and oxidizer delivered. Alternatively, the oxidizer can be placed before a combustion event is desired, and Controller 312 delivers fuel when combustion is desired. Alternatively, the fuel can be placed before a combustion event is desired, and controller 312 delivers oxidizer when combustion is desired. Accordingly, controller 312 is programmed to regulate the amount of fuel introduced into outer pipe 304 by selectively opening and closing valve 309 and to regulate the amount of oxidizer introduced into outer pipe 304 by selectively opening and closing valve 307. Controller 312 is configured to potentiate the exothermic reaction between the oxidizer and the fuel. Controller 312 may potentiate the exothermic reaction by activating, deactivating, and/or modifying a parameter (e.g., a spark output) of the ignition mechanism 310. Controller 312 receives input from an operator. The operator input corresponds to target temperatures and pressures at various points along the length of pipe 300. Controller 312 receives feedback signals from pipe sensors located along the length of pipe 300 (shown as outer pipe sensor 313 and inner pipe sensor 314). Outer pipe sensor 313 provides feedback signals indicative of the outer pipe temperature, outer pipe pressure, outer pipe gas composition including oxidizer and fuel concentrations, and a flammability index of the fuel/oxidizer mixture. Inner pipe sensor 314 provides feedback signals indicative of oil temperature, oil flow rate, oil pressure, and oil composition including the presence of gas, liquid, and solid hydrocarbons, paraffins, and water, including the location of flow blockages. Controller 312 is programmed to provide output information to the operator relating to the feedback signals from sensors 313 and 314.

Controller 312 is programmed to control combustion of the fuel and oxidizer such that the temperature of oil 303 is maintained at a sufficient level to prevent formation of solid buildups (shown as 201 in FIG. 2) along the inner pipe 301 and to dissipate existing solid hydrate, clathrate, and solid paraffin buildup. Paraffins generally have a melting point of about thirty-seven degrees Celsius. Solid hydrates and clathrates (e.g., methane hydrate) generally have a melting point of about twenty-five degrees Celsius at a depth of approximately four kilometers below sea level and a melting point of about zero degrees Celsius at a depth of three hundred meters below sea level. Accordingly, controller 312 maintains the temperature of oil 303 at or above a designated melting temperature that varies based on the pressure and composition of oil 303 as measured by sensor 314. The designated temperature is based on measurements or modeling of the amount of solid hydrates, solid clathrates, and solid paraffins, the heat capacity of the crude oil, the flow rate of the crude oil in pipe 300, and heat losses to the surrounding environment. The designated temperature varies with depth along the length of pipe 300. Alternatively, an operator can define the temperature at various points along pipe 300. The combustion occurs at a location where solid buildup (shown as 201 in FIG. 2) exists along pipe 300, at a location along pipe 300 where free-floating solids contained within oil 303 will pass, or along a designated length of pipe 300. Controller 312 further is configured to maintain the integrity of pipe 300 such that pipe 300 will not burst. Controller 312 is programmed to monitor the temperature, pressure, and air composition within outer pipe 304 via feedback signals from outer pipe sensor 313.

Controller 312 adjusts the combustion of fuel and oxidizer in response to feedback signals from sensors 313 and 314, operator input, and any designated temperature profiles for pipe 300. Controller 312 also adjusts the combustion of fuel and oxidizer to maintain the pressure within outer pipe 304 below a burst point. Controller 312 is configured to adjust the combustion by being programmed to regulate the amount of fuel and oxidizer combusted. Controller 312 is programmed to selectively open and close valves 307 and 308 to provide oxidizer and fuel in discrete doses or pulses to outer pipe 304. Alternatively, controller 312 is configured to provide oxidizer and fuel as a steady stream into outer pipe 304 in which flow rates can be modified. Controller 312 is programmed to meter the amount of oxidizer and fuel introduced within outer pipe 304. Outer pipe 304 may be filled with an inert gas (such as helium, nitrogen, argon, or the like) to reduce the risk of undesired combustion or to moderate temperature or pressure rises.

Figure 4:
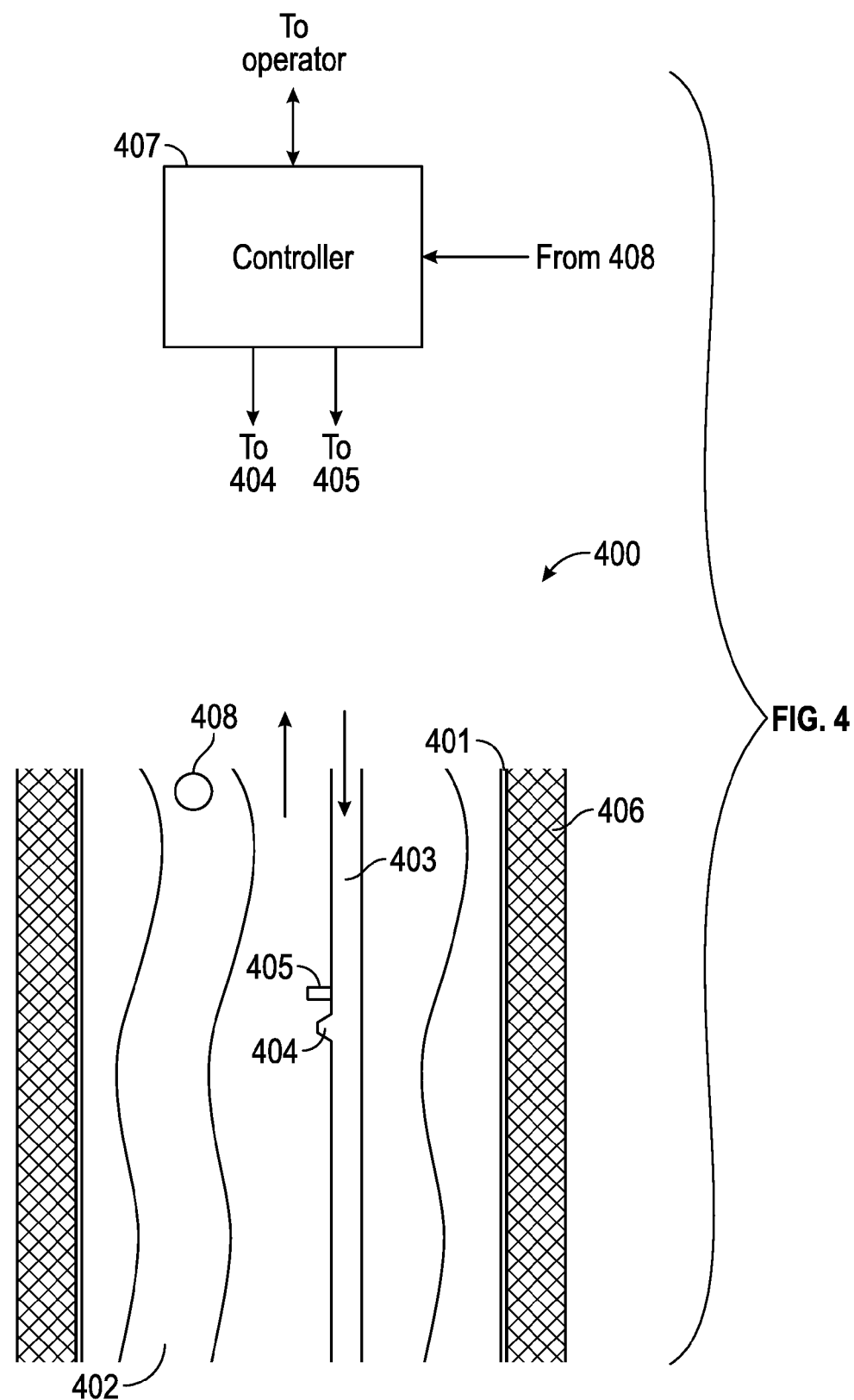
FIG. 4 is a cross-sectional view of another embodiment of a heated oil-carrying pipe.

Referring to FIG. 4, an additional exemplary embodiment of a heated pipe 400 is shown. Pipe 400 is defined by pipe walls 401. Pipe walls 401 are constructed from a material that acts as a thermal insulator. Pipe 400 carries crude oil 402 from an underwater oil well. Pipe 400 may be incorporated into riser pipes (e.g., risers 105 in FIG. 1), pipes within underwater facilities (e.g., collection manifold 106 in FIG. 1), pipes carrying oil directly from well heads, and any other underwater oil transport device or processing facility. Pipe 400 houses oxidizer delivery pipe 403 having a remotely controllable outlet (shown as valve 404) such that an oxidizer is pumped into crude oil 402. The oxidizer can be any of oxygen, atmospheric air, peroxides, nitrates, nitrites, perchlorates, chlorates, chlorites, hypochlorites, dichromates, permanganates, persulfates, or any mixture thereof. Ignition mechanism 405 is mounted within pipe 400 (shown as mounted on oxidizer delivery pipe 403). Oxidizer combusts with a portion of crude oil 402 such that thermal energy generated by the combustion heats crude oil 402 and prevents the buildups of hydrate, clathrate, and paraffin solids (shown as 201 in FIG. 2) and melts existing solids. Alternatively, thermal energy is provided through an exothermic non-combustion based chemical reaction between crude oil 402 and the oxidizer. The non-combustion based chemical reaction may be facilitated through the use of a catalyst. Ignition mechanism 405 generates sparks to facilitate combustion. Alternatively, combustion is hypergolic and occurs spontaneously through a chemical reaction between crude oil 402 and the oxidizer. Pipe 400 is thermally insulated from the outside environment through a layer of insulation 406.

Controller 407 is programmed to control the heating of pipe 400. Alternatively, the oxidizer can be placed before a combustion event is desired. Generally, controller 407 includes processing circuitry including a processor and memory. Controller 407 may be located offsite (e.g., on floating oil rig 101). Controller 407 is configured to potentiate the reaction between crude oil 402 and the oxidizer. Accordingly, controller 407 is programmed to control the combustion of crude oil 402 and the oxidizer. Controller 407 controls combustion by regulating the amount of oxidizer introduced into pipe 400 by selectively opening and closing valve 404. Controller 407 further regulates the combusting by activating and deactivating ignition mechanism 405. Controller 407 receives input from an operator. The operator input corresponds to target temperatures and pressures at various points along the length of pipe 400. Controller 407 receives feedback signals from pipe sensors 408 located along the length of pipe 400. Pipe sensors 408 provide feedback signals indicative of the crude oil temperature, crude oil composition, crude oil flow rate, pipe pressure, oxygen concentration, and the presence of gas, liquid, and solid hydrocarbons, paraffins, and water, including the location of flow blockages. Controller 407 is programmed to provide output information to the operator relating to the feedback signals from sensors 408.

Controller 407 controls the combustion such that the temperature of crude oil 402 reaches and is maintained at a sufficient level to prevent formation of solid buildups (shown as 201 in FIG. 2) along pipe 400 and to dissipate existing solid hydrate, solid clathrate, and solid paraffin buildup. Accordingly, controller 407 maintains the temperature of crude oil 402 at or above a designated temperature that depends on both the pressure and composition of crude oil 402 as measured by sensors 408. The designated temperature is based on measurements or modeling of the amount of solid hydrates, solid clathrates, and solid paraffins, the heat capacity of the crude oil, the flow rate of the crude oil in pipe 400, and heat losses to the surrounding environment. The designated temperature varies with depth along the length of pipe 400. Alternatively, an operator can define the temperature at various points along pipe 400. The combustion occurs at a location where solid buildup (shown as 201 in FIG. 2) exists along pipe 400, at a location along pipe 400 where free-floating solids contained within crude oil 402 will pass, or along a designated length of pipe 400.

Controller 407 is also configured to maintain the integrity of pipe 400 such that pipe 400 will not burst. Controller 407 is programmed to monitor the temperature, pressure, and air composition within pipe 400 and to control the amount of oxidizer combusted with crude oil 402 in order to maintain the temperature and pressure within pipe 400 below a burst point. Combustion of oil and oxidizer generally creates exhaust gases. The presence of exhaust gases within crude oil 402 will increase the pressure within pipe 400. Accordingly, combustion, and thus the amount of exhaust gases, is controlled by regulating the amount of oxidizer input into pipe 400 and by activating and deactivating ignition mechanism 405. Pipe 400 may include vents such that exhaust gases are vented into the surrounding environment. Oxidizer is provided to pipe 400 in discrete doses or pulses. Alternatively, oxidizer is provided into pipe 400 through a steady flow having a modifiable flow rate. If the pressure inside pipe 400 rises too rapidly, controller 407 is configured to cut off any flow of oxidizer into pipe 400, thereby stopping combustion. Alternatively, crude oil 402 and oxidizer undergo a form of condensed phase combustion, in which minimal amounts of exhaust gases are generated. Thus, the pressure increase within pipe 400 is minimized during combustion. The solid particulates remaining after the condensed phase combustion are filtered out of pipe 400.

Figure 5:
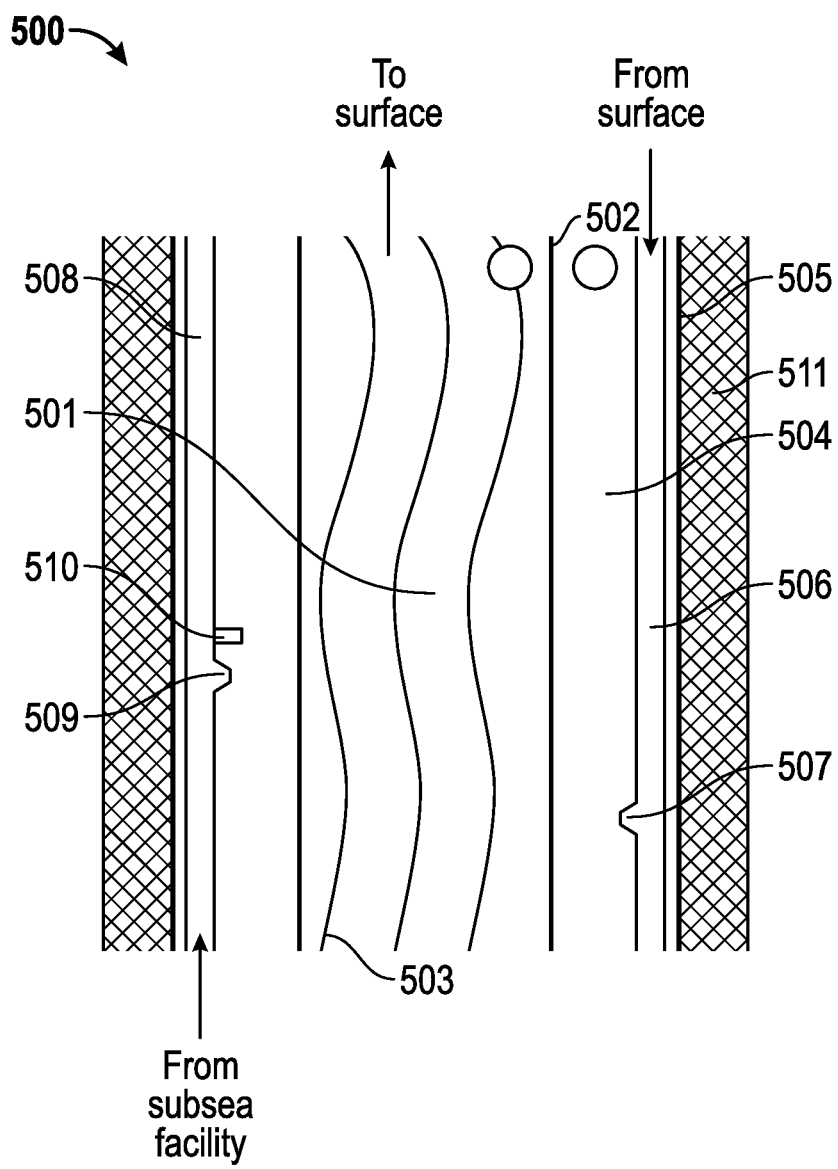
FIG. 5 is a cross-sectional view of another embodiment of a heated oil-carrying pipe.

Referring to FIG. 5, an alternate exemplary embodiment of a heated oil-carrying pipe 500 is shown. Pipe 500 is similar to pipe 300. Pipe 500 is a multi-layered annular pipe having inner pipe 501 and outer pipe 504. Inner pipe 501 is defined by inner pipe wall 502. Inner pipe 501 carries crude oil 503 from underwater oil wells. Outer pipe 504 is defined by outer pipe wall 505. Outer pipe 504 houses oxidizer delivery pipe 506 having a remotely controllable outlet (shown as valve 507) such that an oxidizer is delivered into outer pipe 504 from the surface through valve 507. The oxidizer may be any of oxygen, atmospheric air, peroxides, nitrates, nitrites, perchlorates, chlorates, chlorites, hypochlorites, dichromates, permanganates, persulfates, or any mixture thereof. Outer pipe 504 additionally houses fuel delivery pipe 508 having a remotely controllable outlet (shown as valve 509) such that gaseous fuel is delivered to outer pipe 504.

Crude oil 503 contains methane and natural gas when it is extracted from the underwater oil well. Crude oil 503 passes through an underwater degassing facility (e.g., 107 in FIG. 1) where methane and natural gas is separated from crude oil 503. Pipe 500 utilizes the separated natural gas and methane as fuel to heat pipe 500. Accordingly, methane and natural gas are pumped from the underwater degassing facility into outer pipe 504 through fuel delivery pipe 508. The methane and natural gas combust with the oxidizer delivered by oxidizer delivery pipe 506. The thermal energy generated by the combustion of fuel and the oxidizer heats inner pipe 501 and crude oil 503 such that buildups of solids (shown as 201 in FIG. 2) do not form and existing buildups of solids melt. Ignition mechanism 510 facilitates combustion. Ignition mechanism 510 may be a spark generating mechanism or an electric heating coil. Exhaust gases created by the combustion of the methane, natural gas, and oxidizer are carried to the surface through outer pipe 504. Heating of pipe 500 is controlled by a controller in the same manner as controller 312 controls the heating of pipe 300. Pipe 500 is thermally insulated from the outside environment through a layer of insulation 511. Outer pipe 504 may be filled with inert gas to reduce the risk of undesired combustion.

Figure 6:
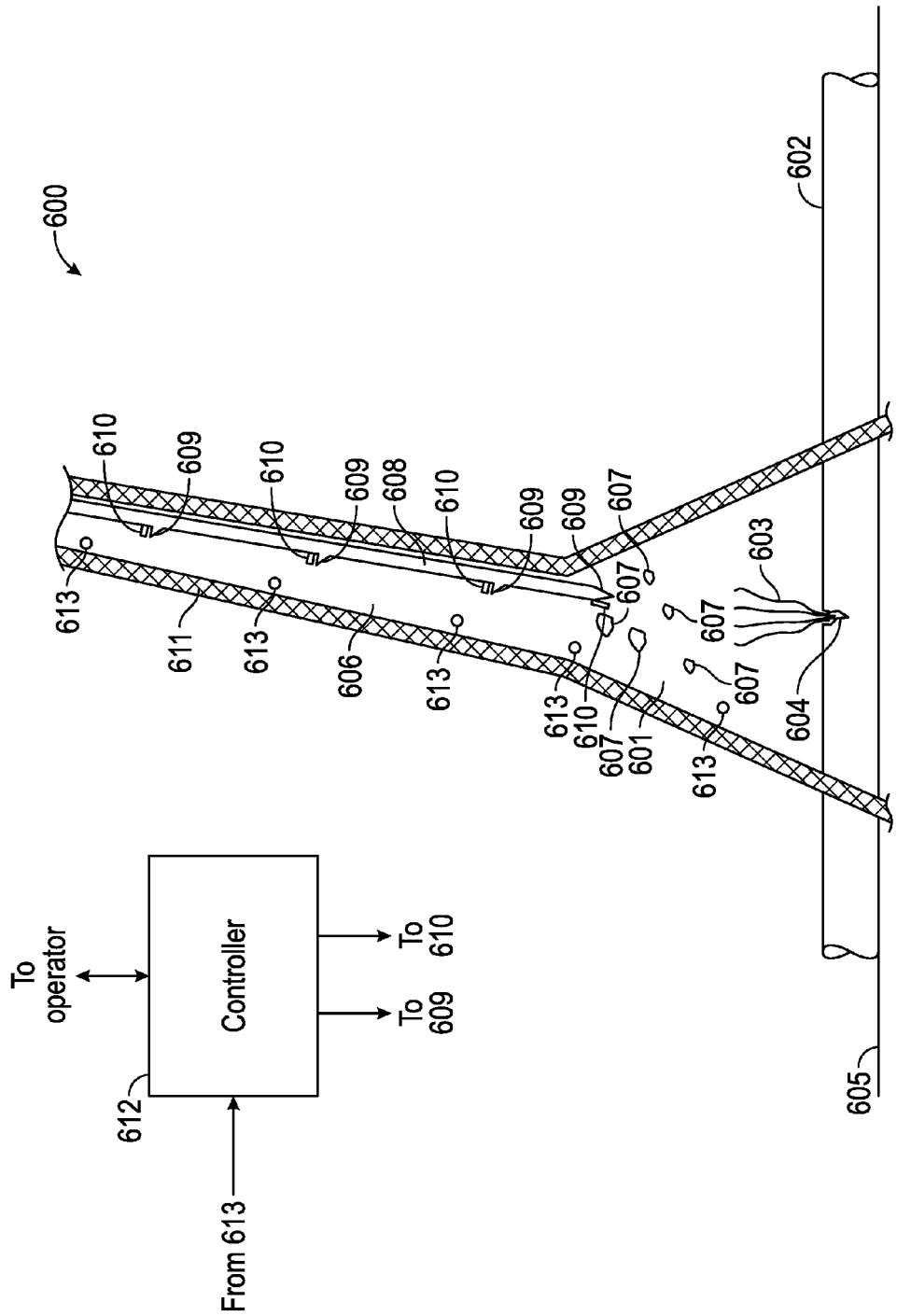
FIG. 6 is a schematic view of an embodiment of an underwater oil leak containment system.

Referring to FIG. 6, an exemplary underwater oil leak containment system 600 is shown. System 600 includes collection shed 601 having an open bottom and an open top. Collection shed 601 is designed to fit over and encapsulate a section of oil-carrying pipe 602 and capture crude oil 603 leaking from pipe 602 through crack 604. Collection shed 601 is constructed out of a thermally insulating material. Pipe 602 rests on seabed 605, and collection shed 601 rests on top of pipe 602 and on seabed 605. In an alternate embodiment, a collection shed is designed to fit over an underwater well head (e.g., over wells 104 in FIG. 1). In yet another alternate embodiment, a collection shed is designed to encapsulate a leak in a pipe off the seabed (e.g., along risers 105 in FIG. 1). It should be understood that collection shed 601 may be easily modified to capture oil from virtually any underwater oil containing structure, and that accordingly, the openings to capture and to export the oil can be in locations other than in the bottom and top of the collection shed (e.g., the sides). Collection shed 601 is shaped like a funnel and routes crude oil 603 into collection pipe 606. Collection pipe 606 attaches to collection shed 601 at the open top of collection shed 601. Collection pipe 606 is constructed out of a thermally insulated material. Collection pipe 606 carries crude oil 603 to the surface of the water where crude oil 603 is captured in a storage vessel.

As crude oil 603 escapes pipe 602 through crack 604, crude oil 603 mixes with water. Crude oil 603 is prone to form solid hydrates and clathrates (shown as solids 607) when mixed with the water. Solids 607 can gather on the surface of collection shed 601 and collection pipe 606 such that flow of crude oil 603 to the surface is restricted or completely stopped. Accordingly, system 600 is designed to provide heat to collection shed 601 and collection pipe 606 through localized underwater combustion of crude oil 603. System 600 includes oxidizer delivery pipe 608. Oxidizer delivery pipe 608 includes remotely controllable outlets (shown as valves 609) and ignition mechanisms 610. Valves 609 and ignition mechanisms 610 are placed throughout the length of collection pipe 606 and within collection shed 601 such that oxidizer can be controllably released into collection shed 601 along the length of collection pipe 606. The oxidizer can be any of oxygen, atmospheric air, peroxides, nitrates, nitrites, perchlorates, chlorates, chlorites, hypochlorites, dichromates, permanganates, persulfates, or any mixture thereof. The oxidizer delivered into collection shed 601 and collection pipe 606 combusts with a portion crude oil 603 to provide thermal energy. Alternatively, the crude oil 603 and supplied oxidizer undergo an exothermic non-combustion based chemical reaction to generate thermal energy. The non-combustion based chemical reaction may be facilitated through the use of a catalyst. The amount of thermal energy provided is directly related to the amount of crude oil 603 combusted. Since oxidizers generally do not exist underwater, the amount of combustion, and therefore the amount of thermal energy, is controlled by regulating the amount of oxidizer released into collection shed 601 and collection pipe 606. The thermal energy generated by the combustion of crude oil 603 and the oxidizer heats collection shed 601, collection pipe 606, and the contents thereof, such that solid hydrates and clathrates 607 do not form and existing solids melt. The thermal energy generated by the combustion of crude oil 603 also melts solid paraffins and prevents paraffin buildup in collection shed 601 and collection pipe 606. Ignition mechanisms 610 facilitate the combustion. Ignition mechanisms 610 may be a spark generating mechanism or an electric heating coil. Alternatively, the combustion is hypergolic and occurs spontaneously through a chemical reaction between the fuel and the oxidizer. Collection shed 601 and collection pipe 606 are thermally insulated from the outside environment through a layer of insulation 611.

Controller 612 is programmed to potentiate and control the underwater exothermic reaction between crude oil 603 and the oxidizer. Generally, controller 612 includes processing circuitry and memory. Controller 612 may be located offsite (e.g., on floating oil rig 101). Controller 612 is configured to control the combustion of crude oil 603 and oxidizer by regulating the amount of oxidizer introduced into collection shed 601 and into collection pipe 606 by selectively opening and closing controlling valves 609. Controller 612 is further configured modify the operation of ignition mechanisms 610 (e.g., the timing and amount of sparks emitted or the temperature of the heating coil). Controller 612 receives input from an operator. The operator input corresponds to target temperatures and pressures at various points along the length of collection pipe 606 and within collection shed 601. Controller 612 receives feedback signals from sensors 613 located along the length of collection pipe 606 and within collection shed 601. Sensors 613 provide feedback signals indicative of the crude oil and seawater mixture temperature, crude oil concentration within the seawater, crude oil composition, crude oil flow rate from crack 604, collection shed and collection pipe pressures, oxygen concentration, and the presence and concentration of gas, liquid, and solid hydrocarbons and paraffins. Controller 612 is programmed to provided output information to the operator relating to the feedback signals from sensors 613.

Controller 612 is programmed to control combustion of crude oil 603 such that the temperature of crude oil 603 and water mixture reaches and is maintained at a sufficient level to prevent formation of solids 607 and to melt existing solids 607 within the collection shed 601 and along the collection pipe 606. Controller 612 is configured to vary the temperature within collection shed 601 and collection pipe 606 depending on the depth beneath the surface of the water, the composition of crude oil 603, and the temperature of the crude oil 603 and water mixture, and the flow of crude oil 603 from pipe 602 as measured by sensors 613. Controller 612 is configured to calculate the optimal temperature at a given point within collection shed 601 and along collection pipe 606 based on measurements or modeling of the amount of solid hydrates, solid clathrates, and solid paraffins, the heat capacity of the crude oil 603, the flow rate of the crude oil 603 out pipe 602, the pressure within collection shed 601 and collection pipe 606, and heat losses to the surrounding environment. Alternatively, an operator provides the optimal temperature input. The combustion occurs at a location where solid buildup (e.g., solids 201 in FIG. 2) exists within collection shed 601 and along collection pipe 606, at a location along collection pipe 606 where free-floating solids contained within oil 603 will pass, or along the length of collection pipe 606.

Controller 612 is further configured to maintain the integrity of collection shed 601 and collection pipe 606. If pressure within collection shed 601 reaches a critical level, collection shed 601 can separate from seabed 605 and allow crude oil 603 to escape into the environment. The critical pressure level is a factor of seabed depth, crude oil flow rate, and the weight of collection shed 601. Further, under extreme pressures, collection pipe 606 may burst. Accordingly, controller 612 monitors the temperature and pressure within collection shed 601 and collection pipe 606 to control the amount of oxidizer to be combusted released in order to maintain a safe operating pressure. Controller 612 is programmed to selectively open and close valves 609 to provided oxidizer in discrete doses or bursts. Valves 609 are independently controllable by controller 612 such a valve at a first depth may be open while a valve at a second depth are closed. Alternatively, controller 612 provides oxidizer as a steady stream. Controller 612 is further programmed to activate and deactivate ignition mechanisms 610. Controller 612 is programmed to meter the amount of oxidizer introduced within system 600.

Figure 7:
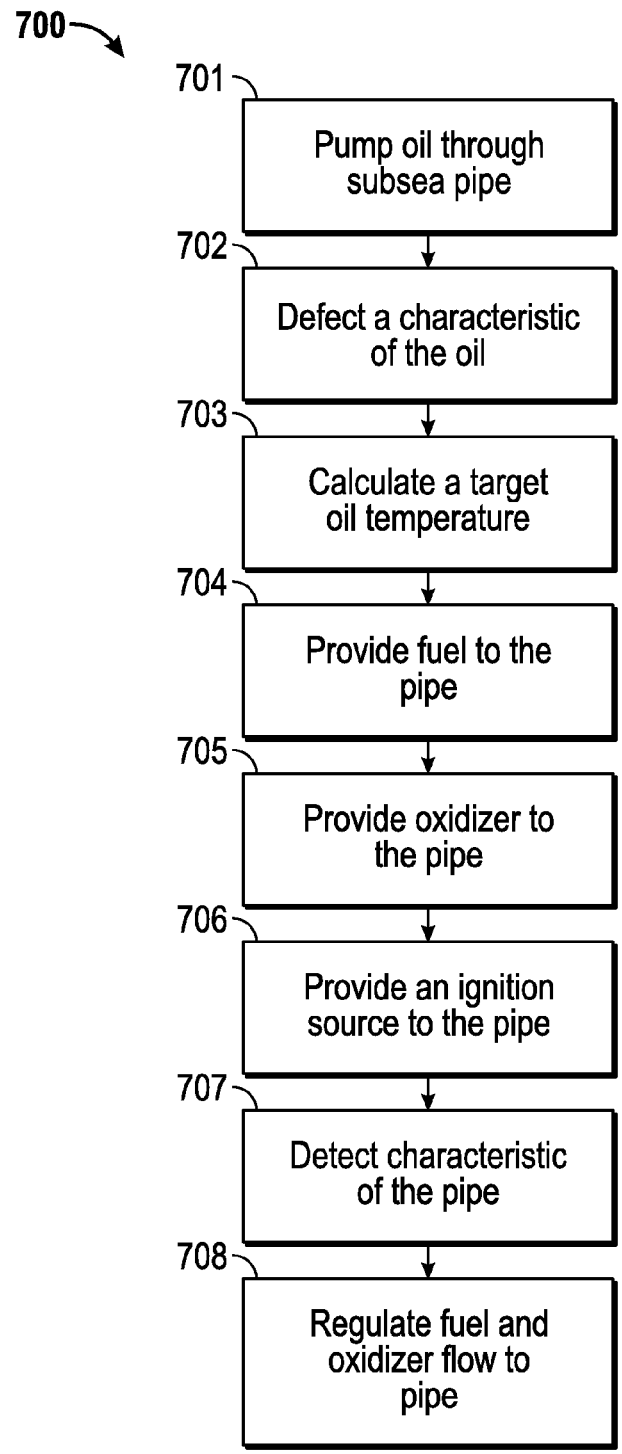
FIG. 7 is a flow chart of a method of heating an underwater oil transport or processing device.

Referring to FIG. 7, a method 700 of heating an underwater oil transport or processing device is shown according to an exemplary embodiment. Oil is pumped through an underwater oil pipe (step 701). The pipe may be an annular pipe having an inner oil-carrying pipe and an outer pipe, where the outer pipe is configured to house a chemical reaction between a fuel and an oxidizer. At least one characteristic of the oil flowing through the oil-carrying pipe is detected (step 702). The characteristic may be selected from water concentration, oil temperature, oil composition, oil flow rate, oil pressure, oxygen concentration, and/or the presence and concentration of gas, liquid, and solid hydrocarbons and paraffins. A target oil temperature is calculated (step 703) based at least in part on the detected characteristic of the oil. The target oil temperature is a sufficient temperature to prevent the formation of solid hydrates, clathrates, and parafins within the oil and to melt existing solids. Fuel is provided to the outer pipe (step 704). The fuel is pumped from the surface. Alternatively, the fuel is provided by an underwater crude oil degassing facility that removes gaseous hydrocarbons from the oil and provides the gaseous hydrocarbons to the outer combustion pipe. Oxidizer is provided to the outer pipe (step 705). The oxidizer may be any of oxygen, atmospheric air, peroxides, nitrates, nitrites, perchlorates, chlorates, chlorites, hypochlorites, dichromates, permanganates, persulfates, or any mixture thereof. An ignition source is provided to the outer combustion pipe (step 706). The ignition source is a spark or a heating element. The ignition source combusts the fuel and oxidizer contained within the outer combustion pipe. The combustion provides the necessary thermal energy to achieve the target oil temperature previously calculated in step 703. Alternatively, thermal energy is provided through an exothermic non-combustion based chemical reaction between the oxidizer and fuel. The non-combustion based chemical reaction between the oxidizer and fuel may occur without an ignition source and may be facilitated with a catalyst. In an alternate arrangement, the oil-carrying pipe is a non-annular, single-chamber pipe. Inert gas may be used to fill any volumes within the pipe where combustion is not desirable or where flammability should be moderated. In the non-annular arrangement, oxidizer is provided directly into the flowing oil, and a portion of the oil serves as the fuel for combustion.

After combustion begins, at least one characteristic of the pipe is detected (step 707). The characteristic may include the air temperature within the outer combustion pipe, the oil temperature within the inner pipe, air pressure in the outer combustion pipe, oil pressure in the inner pipe, and/or air composition within outer pipe. The flow of fuel and the flow of oxidizer to the outer combustion pipe are regulated (step 708) in response to the characteristic detected in step 707. The flow of the fuel and the flow of the oxidizer are regulated independently of each other. Both flows are regulated such that discrete doses or pulses of fuel and oxidizer are released into the outer pipe. Alternatively, oxidizer and fuel flow as a steady stream into outer pipe. Both flows may be completely stopped in response to the characteristic detected in step 707. Exhaust gases generated by the combustion may be vented from the pipe.

It is important to note that the construction and arrangement of the elements of the systems and methods as shown in the exemplary embodiments are illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements. It should be noted that the elements and/or assemblies of the enclosure may be constructed from any of a wide variety of materials that provide sufficient strength or durability, in any of a wide variety of colors, textures, and combinations. Additionally, in the subject description, the word "exemplary" is used to mean serving as an example, instance, or illustration. Any embodiment or design described herein as "exemplary" is not necessarily to be construed as preferred or advantageous over other embodiments or designs. Rather, use of the word "exemplary" is intended to present concepts in a concrete manner. Accordingly, all such modifications are intended to be included within the scope of the present inventions. The order or sequence of any process or method steps may be varied or re-sequenced according to alternative embodiments. Any means-plus-function clause is intended to cover the structures described herein as performing the recited function and not only structural equivalents but also equivalent structures. Other substitutions, modifications, changes, and omissions may be made in the design, operating conditions, and arrangement of the preferred and other exemplary embodiments without departing from scope of the present disclosure or from the spirit of the appended claims.

The present disclosure contemplates methods, systems, and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures may show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps, and decision steps.

What is claimed:

1. A system for containing an underwater oil leak, comprising:
    a collection shed having a first opening configured to capture oil leaking from an underwater structure;
    a pipe coupled to a second opening of the collection shed, wherein the pipe is configured to transport the oil away from the collection shed;
    an oxidizer delivery pipe having a plurality of outlets, the oxidizer delivery pipe configured to supply an oxidizer to at least one of the pipe and the collection shed; and
    a controller configured to independently open and close individual outlets of the plurality of outlets such that the oxidizer is selectively released into at least one of the pipe and the collection shed;

whereby the oxidizer and a portion of the oil release thermal energy in an exothermic reaction.

2. The system of claim 1, further comprising an ignition mechanism, wherein the controller is configured to activate and deactivate the ignition mechanism.

3. The system of claim 1, wherein the controller is configured to selectively release the oxidizer in pulses.

4. The system of claim 1, wherein the exothermic reaction is combustion, and wherein the combustion is hypergolic.

5. The system of claim 1, wherein the exothermic reaction is combustion, and wherein the combustion is condensed-phase combustion.

6. The system of claim 1, further comprising a sensor configured to output a signal to the controller, wherein the controller is configured to potentiate the exothermic reaction in response to the signal.

7. The system of claim 6, wherein the controller is configured to potentiate the exothermic reaction by opening and closing an outlet of the plurality of outlets in response to the signal.

8. The system of claim 6, wherein the controller is configured to potentiate the exothermic reaction by activating and deactivating an ignition mechanism in response to the signal.

9. The system of claim 6, wherein the sensor is configured to detect a characteristic of the oil, wherein the signal corresponds to the characteristic.

10. The system of claim 9, wherein the characteristic is at least one of a pressure and a temperature.

11. The system of claim 9, wherein the characteristic is a presence of a solid within the oil.

12. The system of claim 9, wherein the characteristic is at least one of a flow rate and a location of a flow blockage.

13. The system of claim 9, wherein the characteristic includes at least one of a composition of gas in contact with the oil and a flammability index.

14. The system of claim 1, further comprising a layer of insulation surrounding at least one of the pipe and the collection shed.

15. The system of claim 1, wherein the underwater structure is a well head, and the first opening is configured to fit over the well head.

16. A system for containing an underwater oil leak, comprising:
a collection shed having a first opening configured to capture oil leaking from an underwater structure and a second opening opposite the first opening;
a pipe coupled to the second opening of the collection shed, wherein the pipe is configured to transport the oil away from the collection shed;
an oxidizer delivery pipe having a plurality of outlet valves, the oxidizer delivery pipe configured to supply an oxidizer to at least one of the pipe and the collection shed via the plurality of outlet valves;
an ignition mechanism; and
a controller, wherein the controller is configured to activate and deactivate the ignition mechanism;
wherein individual ones of the plurality of outlet valves are selectively operable to release the oxidizer into at least one of the pipe and the collection shed.

17. The system of claim 16 wherein the controller is further configured to selectively release the oxidizer in pulses.

18. The system of claim 16, wherein the oxidizer and a portion of the oil release thermal energy in an exothermic reaction, wherein the exothermic reaction is combustion, and wherein the combustion is hypergolic.

19. The system of claim 16, wherein the oxidizer and a portion of the oil release thermal energy in an exothermic reaction, wherein the exothermic reaction is combustion, and wherein the combustion is condensed-phase combustion.

20. The system of claim 16 further comprising a sensor, wherein the sensor is configured to output a signal to the controller, wherein the controller is configured to potentiate an exothermic reaction in response to the signal.

21. The system of claim 20, wherein the controller is configured to potentiate the exothermic reaction by opening and closing individual ones of the plurality of outlet valves in response to the signal.

22. The system of claim 21, wherein the controller is configured to potentiate the exothermic reaction by activating and deactivating an ignition mechanism in response to the signal.

23. The system of claim 21, wherein the sensor is configured to detect a characteristic of the oil and the signal corresponds to the characteristic.

24. The system of claim 16, further comprising a layer of insulation surrounding at least one of the pipe and the collection shed.

25. A method of containing an underwater oil leak, comprising:
positioning a collection shed having a first opening over a leak in an underwater structure;
coupling a pipe to a second opening of the collection shed, wherein the pipe is configured to transport the oil away from the collection shed;
providing an oxidizer delivery pipe having a plurality of outlets, the oxidizer delivery pipe configured to supply an oxidizer to at least one of the pipe and to the collection shed; and
independently opening and closing individual outlets of the plurality of outlets such that the oxidizer is selectively released into at least one of the pipe and the collection shed to cause an exothermic reaction between a portion of the oil and the oxidizer.

26. The method of claim 25, further comprising activating an ignition mechanism to cause the exothermic reaction.

27. The method of claim 25, wherein the oxidizer is selectively released in pulses.

28. The method of claim 25, wherein the exothermic reaction is combustion, and wherein the combustion is hypergolic.

29. The method of claim 25, wherein the exothermic reaction is combustion, and wherein the combustion is condensed-phase combustion.

30. The method of claim 25, further comprising potentiating the exothermic reaction by opening and closing an outlet of the plurality of outlets in response to a signal.

31. The method of claim 25, further comprising potentiating the exothermic reaction by activating and deactivating an ignition mechanism in response to a signal.

32. The method of claim 31, further comprising detecting a characteristic of the oil, wherein the signal corresponds to the characteristic.

33. The method of claim 32, wherein the characteristic is at least one of a pressure and a temperature.

34. The method of claim 32, wherein the characteristic is at least one of a flow rate and a location of a flow blockage.

* * * * *